May 9, 1933.  G. TIBERIO  1,908,378
AUTOMATIC PROGRESSIVE TRANSMISSION
Filed Nov. 16, 1931
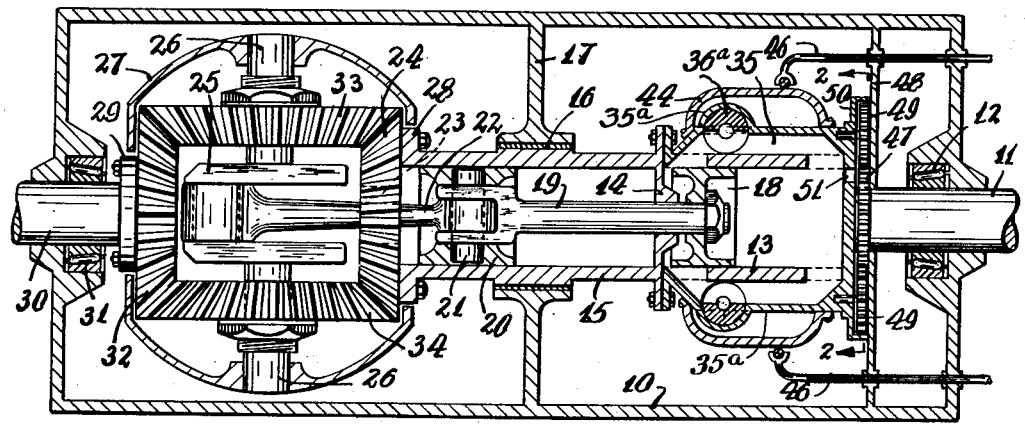
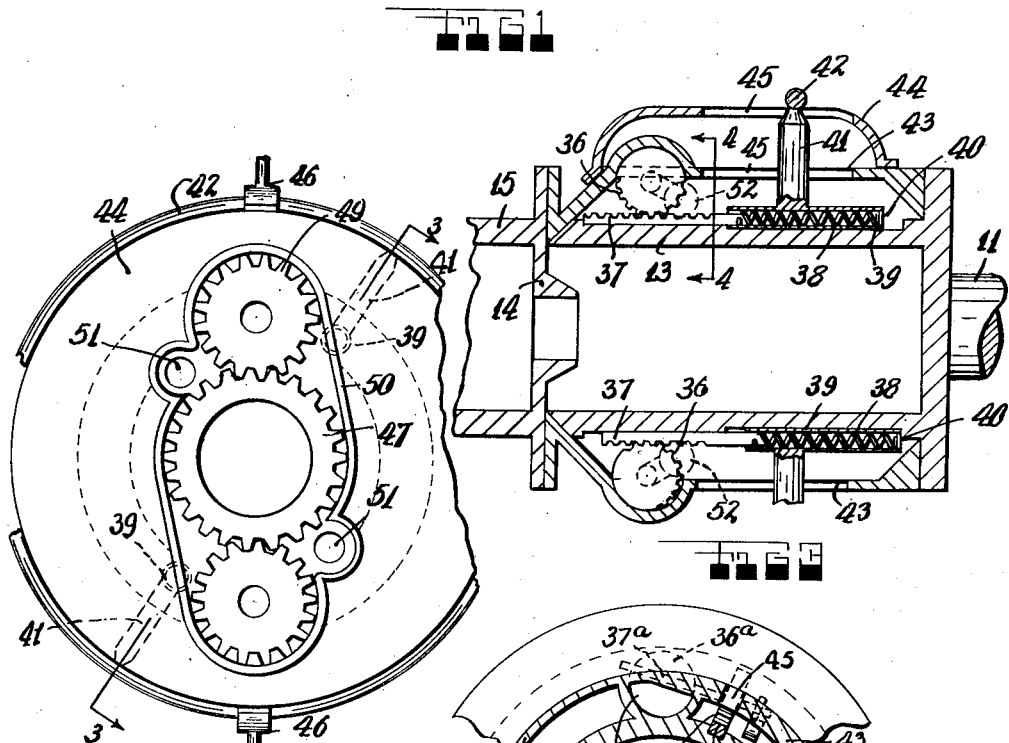
INVENTOR
Giuseppe Tiberio
BY
Zoltan P. Polachek
ATTORNEY Patented May 9, 1933

1,908,378

UNITED STATES PATENT OFFICE

GIUSEPPE TIBERIO, OF NEW YORK, N. Y.

AUTOMATIC PROGRESSIVE TRANSMISSION

Application filed November 16, 1931. Serial No. 575,169.

This invention relates to new and useful improvements in an automatic progressive transmission.

The invention has for an object the construction of an automatic progressive transmission which is characterized by the provision of a differential mechanism and a means for modifying the functions of the satellites thereof.

As a still further object of this invention it is proposed to provide means for automatically modifying the functions of the satellites.

Furthermore, as another object, it is proposed to provide a movable shaft controlling the means for modifying the functions of the satellites.

The invention has for a still further object the provision of a fluid cylinder connected for producing a resistance upon the planetary gears of the differential mechanism, and means for changing the resistance of the passage of the fluid within the cylinder for the purpose of controlling the resistance set up by the cylinder.

As a still further object it is proposed to provide a pump to maintain a consistent pressure within the fluid cylinder to counter-act loss of fluid due to leakage.

A still further object of this invention is the provision of a governor and means for influencing the governor for controlling the resistance of the fluid passage.

Furthermore, another object of this invention is the construction of a device of the class described which is of simple, durable construction, dependable in use and efficient in operation and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a longitudinal sectional view of a device constructed according to this invention.

Fig. 2 is a fragmentary sectional view taken on the line 2—2 of Fig. 1.

Fig. 3 is a fragmentary sectional view taken on the line 3—3 of Fig. 2.

Fig. 4 is a fragmentary enlarged sectional view taken on the line 4—4 of Fig. 3.

The progressive automatic transmission is housed within a casing 10. A driver shaft 11 extends into one end of the casing and is rotatively supported by a bearing 12. This driver shaft rigidly connects with the end of a fluid cylinder 13. The other end of the fluid cylinder is closed by a diaphragm 14 from a cylinder 15 which is rotatively supported intermediately at 16 upon a transverse partition 17 of the casing 10. A piston 18 is slidably mounted within the fluid cylinder 13 and connected with a piston rod 19 which extends through the diaphragm 14 into the cylinder 15. The cylinder merely acts as a bearing to properly guide the rod 19. This is accomplished by the provision of a cross head 20 within the cylinder 15 and a pintle pin 21 pivotally connecting the cross head 20 with the rod 19.

A connecting rod 22 is pivotally connected at one end upon the crosshead 20 by reason of engagement by the pintle pin 21. This connecting rod extends through an opening 23 in the center of a planetary gear 24 rigidly connected on the end of the cylinder 15. The other end of the connecting rod 22 is connected with a crank 25 having trunnions 26 rotative in a differential casing 27. The differential casing is rotative upon a flange 28 on the end of the cylinder 15 and upon a flange 29 on a driven shaft 30 which rotatively extends from the other end of the casing 10. A bearing 31 serves to support the driven shaft 30. A second planetary gear 32 is rigidly fixed upon the inner end of the shaft 30. A satellite gear 33 is fixed upon one of the trunnions 26 and meshes with the planetary gears 24 and 32. An idler satellite 34 merely for the purpose of balancing the mechanism, is loose upon the other trunnion 26 and meshes with the planetaries 24 and 32.

Bypasses 35 are formed by members 35ª and extend from one end of the cylinder 13 to the other. Means is provided for restricting these bypasses to cause resistance to the travel of the piston 18 when the cylinder 13 is filled with a liquid. Preferably, a liquid should be used which can stand high compressive forces. This means comprises a butterfly valve 36ᵃ within each of the bypasses 35. Each of the butterfly valves are fixed upon shafts 37ᵃ extending from the bypass 35 and carrying a gear 36, in mesh with a rack 37 slidably mounted. The rack 37 is connected with a helical spring 38 within a casing 39. One end 40 of this casing is closed so that, when the casing is moved, the rack will also move. The inner end of the spring is fixedly connected with the casing.

Radial arms 41 project from the casing 39 and connect with a control ring 42. A jacket 43 encircles the cylinder 13 and a second jacket 44 encircles the jacket 43. The object of the jackets is to avoid inutile projection of the liquid within the transmission housing and keep the regulator out from the influence of the liquid resistance. Each of the jackets 43, 44 is formed with radial slots 45 through which the radial arms 41 pass. Fork members 46 connect with the ring 42 and extend to the exterior of the casing 10.

A pump is provided for maintaining constant the pressure of the liquid within the cylinder by compensating the losses due to leakage. This pump consists of a stationary gear 47 fixed upon a transverse partition 48 within the casing 10 and in mesh with gears 49 rotatively mounted upon the jacket 43. A pump casing 50 integral with the member 35ᵃ is against the partition 48 and encircles the gears so that the fluid can only be discharged through discharge openings 51 which extend into the cylinder 13. Suitable oil valves from the pump to the fluid cylinder may also be provided.

The transmission casing may be filled with lubricating liquid and will serve as fluid reservoir for functioning the resistance system.

The pump may be eliminated with this liquid.

The operation of the device may be traced by noting that when the driver shaft turns, the rotation will be transmitted to the cylinder 13, thence the cylinder 15 and the planetary gear 24 which is rigidly connected with the cylinder 15. The rotations from the planetary gear 24 may cause the rotation of the satellites 33 and 34 around the trunnions 26 or cause the satellites 33 and 34 to travel with the planetary gear 24 itself. The actual happening will be controlled by the resistance of turning of the satellite gear 33.

The bypass 35 and cylinder 13 can be so designed that there is a certain amount of resistance in the travel of the piston 18 which resistance will cause the shaft 30 to rotate very slowly when the shaft 11 rotates at full speed. An ideal condition would be where the parts where so designed that the shaft 30 remains stationary while the shaft 11 is initially traveling at full speed but this is not possible in practice. The rotations from the shaft 11 will cause the cylinder 13 to rotate so that the regulating weights 52 upon the shafts 37ᵃ will move outwards under centrifugal force and cause the butterfly valves 36ᵃ to close. The motion of the weights 52 will be restrained by the springs 38 to a certain degree. As the butterfly valves 36ᵃ close the resistance to travel of the piston 18 will be increased and this will cause an increase in the speed of rotation of the shaft 30. In this manner, the device will continue to function until the butterfly valves 36ᵃ are completely closed. Then the piston 18 will be locked in a stationary condition. In this latter condition, the shaft 30 will then be traveling at the same speed as shaft 11.

The speed of automatic progressive transmission can be varied by varying the tension of the springs 38 relative to the regulator weights 52. This may be accomplished by moving the rods 46 to cause motion of the ring 42 and a consequent change of position of the casings 39 which hold the springs. Thus, more tension or a lesser degree of tension may be imbedded into the springs 38. Consequently, it will take different periods of time for the regulator weights 52 to completely close the bypasses 35. Thus, the rate of progressive transmission of the shaft 30 relative to the driver shaft will be regulated.

It is to be understood that for convenience of construction and solidity the front side of the differential casing may be attached rigidly to the cylinder 15.

While I have described my invention with some degree of particularity, I realize that in practice various alterations therein may be made. I therefore reserve the right and privilege of changing the form of the details or otherwise altering the arrangement of the correlated parts without departing from the spirit or the scope of the appended claims.

Having thus described my invention, what I claim as new, and desire to secure by United States Letters Patent is:—

1. In an automatic progressive transmission, a differential mechanism composed of planetary gears and satellites, means for connecting a driver shaft with one of the planetary gears, means for connecting a driven shaft with the other of the planetary gears, said driven shaft remaining substantially stationary while the satellites remain substantially free to rotate, and means for resisting with progressive force rotation of one of the satellites until the satellite is restricted from rotating to cause the driven shaft to turn at the same speed as the drive shaft, said resisting means comprising a crank connected with said satellite, a fluid cylinder with a piston, connecting mechanism between said crank and piston, a bypass from end to end of said cylinder, and automatic means for closing said bypass upon rotation of said cylinder, said automatic means, comprising a butterfly valve in the bypass, a gear connected for turning said butterfly valve, a rack in mesh with said gear, resilient means connected with said rack, and regulator weights for closing said butterfly valve by causing compression of said resilient means, and means for changing the resiliency of said resilient means, said resilient means comprises a housing mounted upon the fluid cylinder and a spring in the housing and acting between the housing and the rack.

2. In an automatic progressive transmission, a differential mechanism composed of planetary gears and satellites, means for connecting a driver shaft with one of the planetary gears, means for connecting a driven shaft with the other of the planetary gears, said driven shaft remaining substantially stationary while the satellites remain substantially free to rotate, and means for resisting with progressive force rotation of one of the satellites until the satellite is restricted from rotating to cause the driven shaft to turn at the same speed as the driver shaft, said resisting means comprising a crank connected with said satellite, a fluid cylinder with a piston, connecting mechanism between said crank and piston, a bypass from end to end of said cylinder, and automatic means for closing said bypass upon rotation of said cylinder, said automatic means, comprising a butterfly valve in the bypass, a gear connected for turning said butterfly valve, a rack in mesh with said gear, resilient means connected with said rack, and regulator weights for closing said butterfly valve by causing compression of said resilient means, and means for changing the resiliency of said resilient means, comprising a housing holding said resilient means, and means for changing the position of said housing to cause stresses within the resilient means, comprising a radial arm projecting from the housing, a control ring connected upon the said arm, and means for varying the position of the control ring.

3. In an automatic progressive transmission, a differential mechanism composed of planetary gears and satellites, means for connecting a driver shaft with one of the planetary gears, means for connecting a driven shaft with the other of the planetary gears, said driven shaft remaining substantially stationary while the satellites remain substantially free to rotate, and means for resisting with progressive force rotation of one of the satellites until the satellite is restricted from rotating to cause the driven shaft to turn at the same speed as the driver shaft, said resisting means comprising a crank connected with said satellite, a fluid cylinder with a piston, connecting mechanism between said crank and piston, a bypass from end to end of said cylinder, and automatic means for closing said bypass upon rotation of said cylinder, said automatic means, comprising a butterfly valve in the bypass, a gear connected for turning said butterfly valve, a rack in mesh with said gear, resilient means connected with said rack, and regulator weights for closing said butterfly valve by causing compression of said resilient means, and means for changing the resiliency of said resilient means, comprising a housing holding said resilient means, and means for changing the position of said housing to cause stresses within the resilient means, comprising a radial arm projecting from the housing, a control ring connected upon the said arm, and means for varying the position of the control ring, comprising forked members engaging the ring and extending to the exterior of the device.

4. In an automatic progressive transmission, a differential mechanism composed of planetary gears and satellites, means for connecting a driver shaft with one of the planetary gears, means for connecting a driven shaft with the other of the planetary gears, said driven shaft remaining substantially stationary while the satellites remain substantially free to rotate, and means for resisting with progressive force rotation of one of the satellites until the satellite is restricted from rotating to cause the driven shaft to turn at the same speed as the driver shaft, said resisting means comprising a crank connected with said satellite, a fluid cylinder with a piston, connecting mechanism between said crank and piston, a bypass from end to end of said cylinder, and automatic means for closing said bypass upon rotation of said cylinder, said automatic means, comprising a butterfly valve in the bypass, a gear connected for turning said butterfly valve, a rack in mesh with said gear, resilient means connected with said rack, and regulator weights for closing said butterfly valve by causing compression of said resilient means, and means for changing the resiliency of said resilient means, comprising a housing holding said resilient means, and means for changing the position of said housing to cause stresses within the resilient means, comprising a radial arm projecting from the housing, and means for adjusting the position of the said radial arm.

5. In an automatic progressive transmission, a differential mechanism composed of planetary gears and satellites, means for connecting a driver shaft with one of the planetary gears, means for connecting a driven shaft with the other of the planetary gears, said driven shaft remaining substantially stationary while the satellites remain substantially free to rotate, and means for resisting with progressive force rotation of one of the satellites until the satellite is restricted from rotating to cause the driven shaft to turn at the same speed as the driver shaft, said resisting means comprising a crank connected with said satellite, a fluid cylinder with a piston, connecting mechanism between said crank and piston, a bypass from end to end of said cylinder, and automatic means for closing said bypass upon rotation of said cylinder comprising a shaft rotatively mounted in the bypass, a butterfly valve fixed upon said shaft, regulator weights fixed upon said shaft for closing the valve, and means for normally urging the valve open.

6. In an automatic progressive transmission, a differential mechanism composed of planetary gears and satellites, means for connecting a driver shaft with one of the planetary gears, means for connecting a driven shaft with the other of the planetary gears, said driven shaft remaining substantially stationary while the satellites remain substantially free to rotate, and means for resisting with progressive force rotation of one of the satellites until the satellite is restricted from rotating to cause the driven shaft to turn at the same speed as the driver shaft, said resisting means comprising a crank connected with said satellite, a fluid cylinder with a piston, connecting mechanism between said crank and piston, a bypass from end to end of said cylinder, and automatic means for closing said bypass upon rotation of said cylinder, said automatic means, comprising a butterfly valve in the bypass, a gear connected for turning said butterfly valve, a rack in mesh with said gear, resilient means connected with said rack, and regulator weights for closing said butterfly valve by causing compression of said resilient means.

7. In an automatic progressive transmission, a differential mechanism composed of planetary gears and satellites, means for connecting a driver shaft with one of the planetary gears, means for connecting a driven shaft with the other of the planetary gears, said driven shaft remaining substantially stationary while the satellites remain substantially free to rotate, and means for resisting with progressive force rotation of one of the satellites until the satellite is restricted from rotating to cause the driven shaft to turn at the same speed as the driver shaft, said resisting means comprising a crank connected with said satellite, a fluid cylinder with a piston, connecting mechanism between said crank and piston, a bypass from end to end of said cylinder, and automatic means for closing said bypass upon rotation of said cylinder, said automatic means, comprising a butterfly valve in the bypass, a gear connected for turning said butterfly valve, a rack in mesh with said gear, resilient means connected with said rack, and regulator weights for closing said butterfly valve by causing compression of said resilient means, and means for changing the resiliency of said resilient means.

8. In an automatic progressive transmission, a differential mechanism composed of planetary gears and satellites, means for connecting a driver shaft with one of the planetary gears, means for connecting a driven shaft with the other of the planetary gears, said driven shaft remaining substantially stationary while the satellites remain substantially free to rotate, and means for resisting with progressive force rotation of one of the satellites until the satellite is restricted from rotating to cause the driven shaft to turn at the same speed as the driver shaft, said resisting means comprising a crank connected with said satellite, a fluid cylinder with a piston, connecting mechanism between said crank and piston, a bypass from end to end of said cylinder, and automatic means for closing said bypass upon rotation of said cylinder, said automatic means, comprising a butterfly valve in the bypass, a gear connected for turning said butterfly valve, a rack in mesh with said gear, resilient means connected with said rack, and regulator weights for closing said butterfly valve by causing compression of said resilient means, and means for changing the resiliency of said resilient means, comprising a housing holding said resilient means, and means for changing the position of said housing to cause stresses within the resilient means.

9. In an automatic progressive transmission, a differential mechanism composed of planetary gears and satellites, means for connecting a driver shaft with one of the planetary gears, means for connecting a driven shaft with the other of the planetary gears, said driven shaft remaining substantially stationary while the satellites remain substantially free to rotate, and means for resisting with progressive force rotation of one of the satellites until the satellite is restricted from rotating to cause the driven shaft to turn at the same speed as the driver shaft, and a pump for maintaining the cylinder full of fluid, said pump comprising a stationary gear, rotatable gears mounted eccentrically on said cylinder and meshing with said stationary gears, a casing around said gears, and a discharge into said cylinder.

In testimony whereof I have affixed my signature.

GIUSEPPE TIBERIO.